(12) United States Patent
Cullen

(10) Patent No.: US 6,443,194 B1
(45) Date of Patent: Sep. 3, 2002

(54) SCREW ANCHOR ADJUSTABLE DENSITY CONTROL MEANS

(76) Inventor: Steven R. Cullen, Box 747, Astoria, OR (US) 97103

( * ) Notice: Subject to any disclaimer, the term of this patent is extended or adjusted under 35 U.S.C. 154(b) by 0 days.

(21) Appl. No.: 10/014,983

(22) Filed: Dec. 11, 2001

(51) Int. Cl.⁷ ................................................ B65B 1/04
(52) U.S. Cl. ........................... 141/313; 141/73; 53/527
(58) Field of Search .............................. 141/71, 73, 74, 141/114, 313–317; 100/65, 66; 53/436, 459, 527, 529, 567, 576

(56) References Cited

U.S. PATENT DOCUMENTS

| | | |
|---|---|---|
| 3,687,061 A | 8/1972 | Eggenmuller et al. |
| 4,046,068 A | 9/1977 | Eggenmuller et al. |
| 4,337,805 A | 7/1982 | Johnson et al. |
| 4,621,666 A | 11/1986 | Ryan |
| 4,747,343 A * | 5/1988 | St. Clair .................... 100/145 |
| 5,297,377 A | 3/1994 | Cullen |
| 5,425,220 A | 6/1995 | Cullen |
| 5,671,594 A | 9/1997 | Cullen |
| 5,899,247 A * | 5/1999 | Cullen ........................ 141/114 |
| 6,202,389 B1 * | 3/2001 | Inman et al. ................ 141/313 |

* cited by examiner

*Primary Examiner*—Steven O. Douglas
(74) *Attorney, Agent, or Firm*—Thomte, Mazour & Niebergall; Dennis L. Thomte

(57) ABSTRACT

A screw anchor adjustable density control device is provided for use with a bagging machine for bagging material into bags having a closed end and an open mouth. The bagging machine comprises a wheeled frame having a tunnel thereon which includes an intake end for receiving the material to be bagged and an output end adapted to receive the open mouth of the bag. A selectively rotatable screw anchor is secured to the wheeled frame within the tunnel and extends rearwardly therefrom into the material being packed within the bag. The rotational rate of the screw anchor is selectively varied for varying the density of the material within the bag. Preferably, the screw anchor is selectively movable between retracted and extended positions.

5 Claims, 3 Drawing Sheets

SCREW ANCHOR ADJUSTABLE DENSITY CONTROL MEANS

BACKGROUND OF THE INVENTION

1. Field of the Invention

This invention relates to an agricultural bagging machine and more particularly to a screw anchor adjustable density control means for an agricultural bagging machine.

2. Description of the Related Art

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor or the like which conveys the silage into a tunnel on which the bag is positioned so that the bag is filled. As silage is loaded into the bag, the bagging machine moves away from the filled end of the bag in a controlled fashion so as to achieve uniform compaction of the silage material within the bag. In U.S. Pat. No. 4,337,805, silage is forced by means of a rotor from the intake chamber of the machine through the output chamber of the machine and into the agricultural bag with a backstop structure yieldably engaging the closed end of the agricultural bag to resist the movement of the bagging machine away from the filled end of the agricultural bag as silage is forced into the bag. The structure of the '805 patent includes a pair of drums rotatably mounted on the bagging machine with a brake associated therewith for braking or resisting the rotation of the drum with a selected brake force. A cable is wrapped around the drum and is connected to the backstop.

Although the cable drum and backstop structure of the '805 patent and other similar machines does function generally satisfactorily, the cables, which are positioned on opposite sides of the bag, can create openings or holes in the bag which will adversely affect the fermentation process within the bag. A further disadvantage of the cable drum and backstop structure of the devices such as shown in the '805 patent is that the cables must be rewound after the filling of an individual bag. A further disadvantage of the cable drum and backstop structure of the machine such as disclosed in the '805 patent is that a dangerous condition exists should one of the cables break.

In an effort to overcome some of the disadvantages of machines such as disclosed in the '805 patent, an attempt was made in U.S. Pat. No. 4,621,666 to achieve the desired bagging operation while eliminating the need for the cable drum and backstop structure. In the '666 patent, the wheels on the bagging machine were braked to provide the desired resistance to the filling of the bag. Although the brake system of the '666 patent apparently met with some success, it is believed that machines such as disclosed in the '666 patent experience slippage difficulties in wet field conditions which adversely affect the bagging operation. It is also believed that the brake means alone on the bagging machine such as those disclosed in the '666 patent do not achieve the desired compaction of the silage material within the bag.

In applicant's U.S. Pat. No. 5,297,377, a bagging machine is described which has the capability of enabling the density of the silage material to be selectively controlled without the need of an elaborate braking system. In applicant's U.S. Pat. No. 5,297,377, a density control means is described which included a plurality of cables which are positioned in the flow of the silage material being bagged. In order to vary the density of the material in the machine of the '377 patent, more or less cables are employed based on the material being packed. For example, corn silage flows easy and would require more cables while alfalfa packs hard and would use less cables.

In applicant's U.S. Pat. No. 5,425,220, a density control means is described which includes a pair of intersecting cables positioned in the flow of the silage material being bagged. In order to vary the density of the material in the machine of the '220 patent, the relationship of the intersecting or crisscrossing cables is varied. In applicant's U.S. Pat. No. 5,671,594, a fixed beveled press plate is disclosed for use with a density control cable.

Although the use of the density control cables in applicant's previous patents such as U.S. Pat. No. 5,671,594 has met with success, the adjustment of the cable loop takes approximately ten feet of machine movement before the adjusted cable loop becomes completely effective.

In applicant's U.S. Pat. No. 5,899,247, an adjustable anchor wing was provided for an agricultural bagging machine with the anchor wing being positioned in the material being bagged to vary the density of the material being bagged. Although applicant's previous density control means has met with considerable success, it is believed that the instant invention is an improvement thereover.

SUMMARY OF THE INVENTION

An agricultural feed bagging machine is disclosed which comprises a wheeled frame having rearward and forward ends. A tunnel is provided on the wheeled frame and has an intake end for receiving silage material or the like and an output end adapted to receive the mouth of an agricultural bag. A hopper or feed table is provided on the wheeled frame for receiving the material to be bagged and is adapted to supply the same to a feed compression means such as a rotatable rotor which forces the material into the tunnel and into the bag. A support is provided on the frame means and has a rotatable screw anchor mounted thereon which is positioned within the material being packed. The speed of rotation of the rotatable screw anchor is variable as is the direction of rotation. Further, means is provided for moving the screw anchor rearwardly into the material in the bag and for retracting the same.

It is therefore a principal object of the invention to provide a screw anchor adjustable density control means.

A further object of the invention is to provide a screw anchor adjustable density control means for an agricultural bagging machine.

Still another object of the invention is to provide a screw anchor adjustable density control means which provides an improved way of adjusting the density of material being packed within an agricultural bag by anchoring the machine to its own mass with a screw thread and to adjust the density higher or lower by rotation of the screw anchor.

Yet another object of the invention is to provide an invention of the type described above, the direction of which may be reversed at the finish of a bag to ensure that the finished material/feed at the end of the bag stays packed as the machine is removed from the end of the bag.

Yet another object of the invention is to provide a screw anchor adjustable density control means wherein means is provided for retracting the screw anchor from its rearward working position.

Still another object of the invention is to provide a screw anchor adjustable density control means which enables the density of the packed material to be precisely controlled.

Still another object of the invention is to provide a screw anchor adjustable density control means wherein the density control means acts as an anchor in the material being bagged to prevent the bagging machine from rolling ahead prematurely.

Yet another object of the invention is to provide a screw anchor adjustable density control means which may be mounted on a conventional agricultural bagging machine without extensive modifications thereof.

Still another object of the invention is to provide a screw anchor adjustable density control means for an agricultural bagging machine which is economical of manufacture and durable in use.

These and other objects of the invention will be apparent to those skilled in the art.

DESCRIPTION OF THE PREFERRED EMBODIMENT

Figure 1:
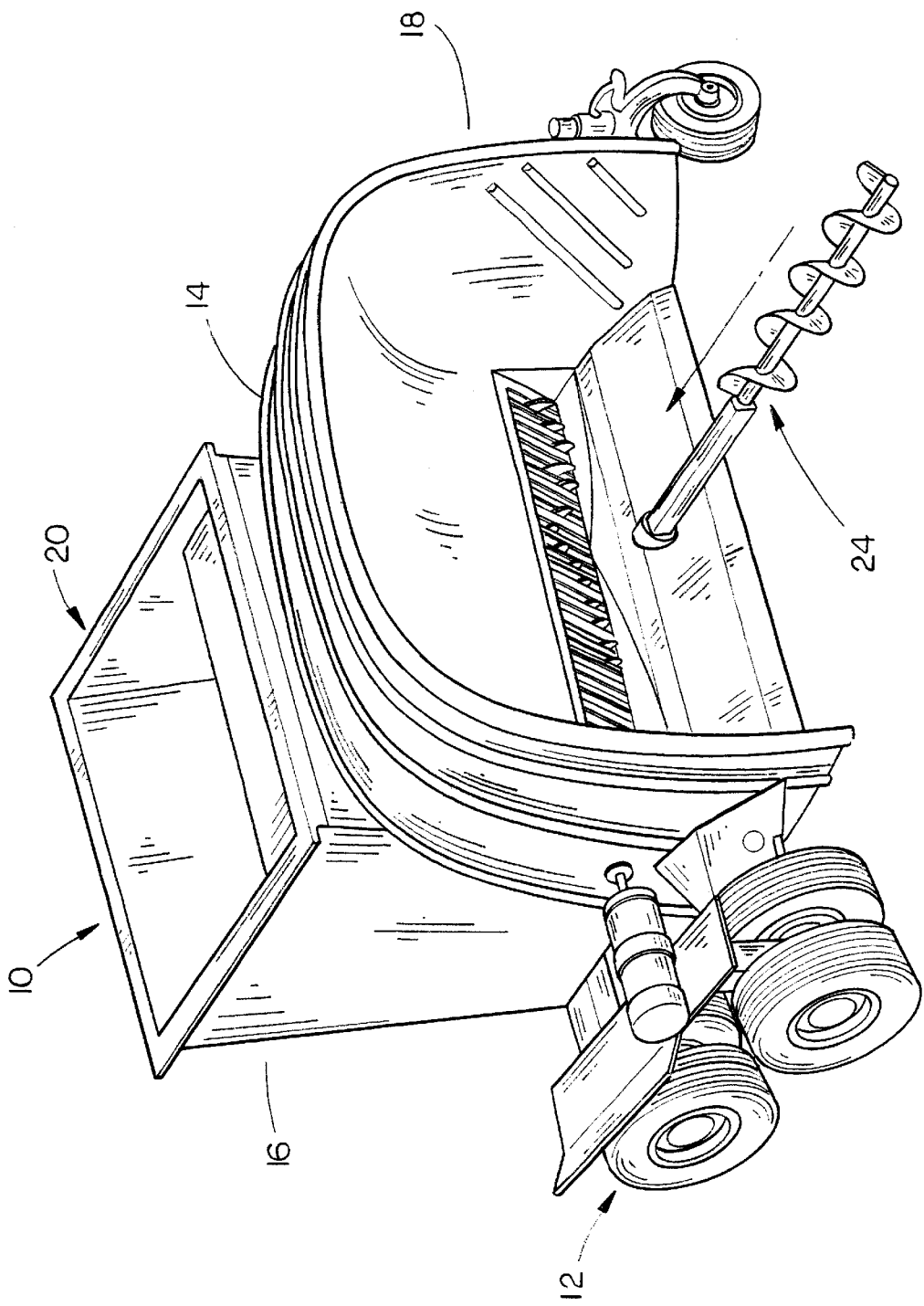
FIG. 1 is a rear perspective view of an agricultural bagging machine having the screw anchor adjustable density control means of this invention mounted thereon.
Figure 2:
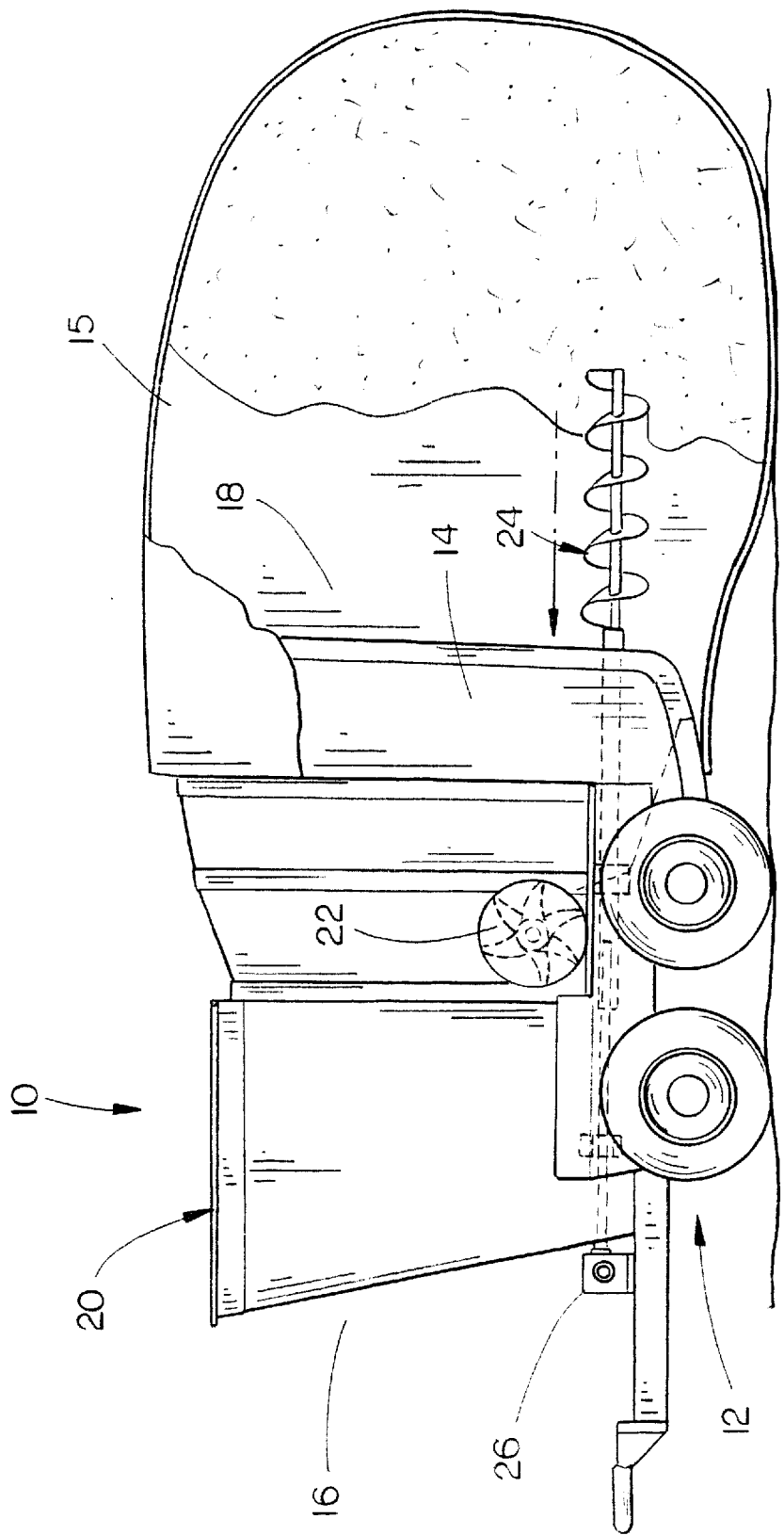
FIG. 2 is a side elevational view of the machine of FIG. 1 with portions of the agricultural bag cut away to more fully illustrate the invention.

The numeral 10 refers generally to an agricultural bagging machine such as disclosed in U.S. Pat. No. 5,671,594. Machine 10 includes a wheeled frame 12 having a tunnel 14 mounted thereon upon which is normally positioned the open mouth of a conventional agricultural bag 15. Although the preferred embodiment includes a wheeled frame 12, a non-wheeled frame could also be employed. For purposes of conciseness, the power means for driving the various components of the machine will not be disclosed, since the same does not form a part of the invention. The power means could be an engine mounted on the machine or it could be a power takeoff (PTO) shaft connected to a tractor PTO.

For purposes of description, the bagging machine 10 will be described as including a forward end 16 and a rearward end 18. Bagging machine 10 includes a hopper means 20 or other material receiving means, such as a feed table, conveyors or the like, at the forward end thereof which is adapted to receive the material to be bagged from a truck, wagon, etc. A horizontally disposed rotatable rotor 22 of conventional design is located at the lower end of the hopper means 20 for forcing the material to be bagged into the tunnel 14 and into the bag in conventional fashion. Although a horizontally disposed rotor is disclosed, it is possible that other types of material compression or compaction means could be employed such as augers, packers, etc.

The screw anchor adjustable density control means is referred to generally by the reference numeral 24 which is seen to extend rearwardly from the machine 10 within the tunnel 14. The screw anchor adjustable control means 24 includes a gear box 26 which is conveniently positioned on the frame means 12 at the forward end thereof so that a power means such as internal combustion engine or power takeoff shaft may be connected thereto to cause the rotation of drive shaft 28 in either a counterclockwise direction or a clockwise direction as viewed in FIG. 3.

Figure 3:
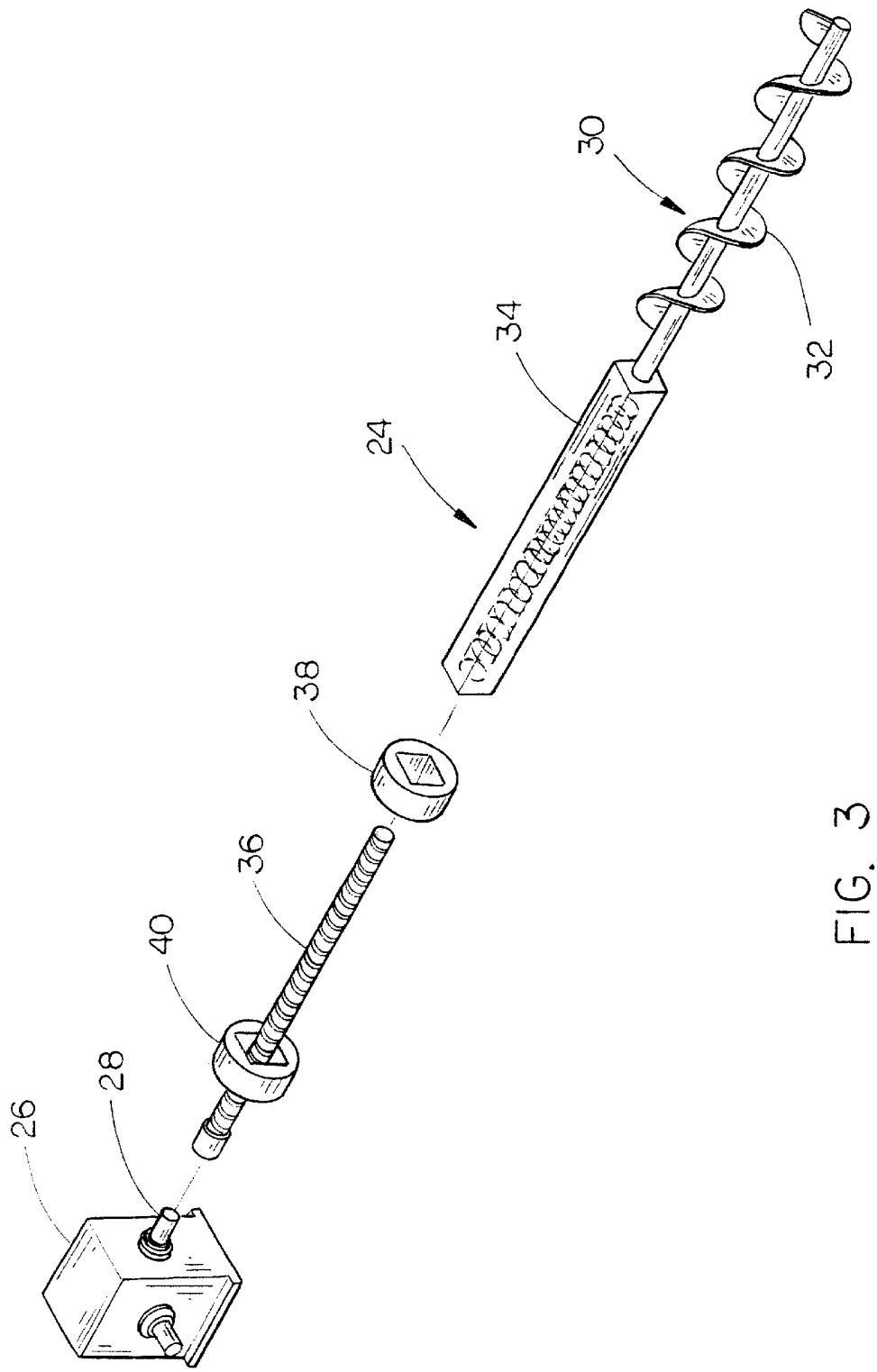
FIG. 3 is an exploded perspective view of the screw anchor.

An elongated screw 30 having flighting 32 mounted thereon is operatively connected to the drive shaft 28 for rotation therewith. Preferably, means is provided for extending the screw 30 rearwardly and for retracting the screw 30 forwardly so that the position of the screw 30, with respect to the tunnel and the material being bagged, may be selectively varied. One means of moving the screw 30 rearwardly and forwardly is illustrated in FIG. 3. An internally threaded connector 34 is secured to the forward end of screw 30 which threadably receives a threaded shaft 36 which is connected to the drive shaft 28. Locking members 38 and 40 maintain the connector 34 and shaft 36 in various selected positions with respect to one another while permitting shaft 36 to rotate connector 34. The structure shown in FIG. 3 could be replaced by a hydraulic cylinder arrangement or the like which will permit the screw 30 to be selectively moved forwardly and rearwardly. In some cases, it may not be necessary to selectively move screw 30 rearwardly and forwardly with respect to the tunnel 14 and the material being bagged, but it is preferred that such selective positioning be provided.

The screw anchor adjustable density means of this invention provides the same anchor-like effect as in applicant's U.S. Pat. Nos. 5,297,377 and 5,899,247. The screw anchor of this invention is positioned in the material/feed being bagged at least as far as the output end of the tunnel so that there is sufficient weight of the mass of material/feed to hold the machine from rolling ahead prematurely before the desired density of material/feed is achieved in the bag. By adjusting the rotational speed of the screw anchor 24, the density of the material/feed within the bag may be controlled. By rotating the screw anchor 24 at a slower equivalent screw pitch speed than the actual machine's filling capacity, which causes forward movement of the machine, the density of the material/feed becomes greater. By rotating the screw anchor at a greater rotational rate, the density of material/feed is less since the screw anchor tends to push the machine away from the material/feed.

When the bagging has been completed, the machine can screw itself off the end of the bag by reversing the rotation of the screw anchor in the appropriate direction without putting more material/feed in the receiving end of the machine, which keeps the material/feed tight within the bag and also saves many linear feet of plastic bag.

By having the screw anchor designed on a telescoping/retractable drive system, the screw assembly can be positioned well within the tunnel for transport purposes and to be out of the way during bag installation at the start of the bag.

Thus it can be seen that the invention accomplishes at least all of its stated objectives.

I claim:

1. A bagging machine for bagging material into bags having a closed end and an open mouth, comprising:
   a wheeled frame having rearward and forward ends;
   a tunnel on said wheeled frame having an intake end for receiving the material to be bagged and an output end adapted to receive the open mouth of the bag;
   said tunnel having opposite sides;
   a material receiving means on said wheeled frame forwardly of said tunnel for receiving the material to be bagged;
   a material packing means on said wheeled frame at the intake end of said tunnel for forcing the material to be bagged from said material receiving means into said tunnel and into said bag;
   and a density control assembly operatively mounted on said wheeled frame which is positioned rearwardly of the intake end of said tunnel;

said density control assembly comprising a selectively rotatable screw anchor.

2. The bagging machine of claim 1 further including means for selectively varying the speed of rotation of said screw anchor.

3. The bagging machine of claim 1 wherein said screw anchor comprises an elongated, substantially horizontally disposed shaft having screw flighting extending therefrom.

4. A bagging machine for bagging material into bags having a closed end and an open mouth, comprising:

a wheeled frame having rearward and forward ends;

a tunnel on said wheeled frame having an intake end for receiving the material to be bagged and an output end adapted to receive the open mouth of the bag;

said tunnel having opposite sides;

a material receiving means on said wheeled frame forwardly of said tunnel for receiving the material to be bagged;

a material packing means on said wheeled frame at the intake end of said tunnel for forcing the material to be bagged from said material receiving means into said tunnel and into said bag;

and a density control assembly operatively mounted on said wheeled frame which is positioned rearwardly of the intake end of said tunnel;

said density control assembly comprising a selectively rotatable screw anchor and a means for selectively changing the speed and direction of said screw anchor.

5. A bagging machine for bagging material into bags having a closed end and an open mouth, comprising:

a wheeled frame having rearward and forward ends;

a tunnel on said wheeled frame having an intake end for receiving the material to be bagged and an output end adapted to receive the open mouth of the bag;

said tunnel having opposite sides;

a material receiving means on said wheeled frame forwardly of said tunnel for receiving the material to be bagged;

a material packing means on said wheeled frame at the intake end of said tunnel for forcing the material to be bagged from said material receiving means into said tunnel and into said bag;

and a density control assembly operatively mounted on said wheeled frame which is positioned rearwardly of the intake end of said tunnel;

said density control assembly comprising a selectively rotatable screw anchor and a means for selectively moving said screw anchor in a forwardly and rearwardly position with respect to said tunnel.

\* \* \* \* \*